United States Patent Office 3,470,208
Patented Sept. 30, 1969

3,470,208
METHOD FOR THE PREPARATION OF POLYMERIZATION-GRADE TRIOXANE
Ralph H. Lasco, Painesville, and Emmett J. Ferretti, Chesterland, Ohio, assignors to Diamond Shamrock Corporation, a corporation of Delaware
No Drawing. Filed July 12, 1965, Ser. No. 471,403
Int. Cl. C07d 19/00
U.S. Cl. 260—340
10 Claims

ABSTRACT OF THE DISCLOSURE

In the method for the preparation of polymerization-grade trioxane by distilling an aqueous formaldehyde solution and subsequently separating trioxane from the resulting distillate by extraction with an organic, water-immiscible solvent, the extracted trioxane is purified by treatment with a basic compound, followed by contact with a molecular sieve. The final trioxane product contains essentially no formaldehyde and less than 20 p.p.m. each of water and formic acid. As continuously operated, the distillation process produces trioxane at a rate which is at least 125 grams per hour per each 1000 grams of reaction mixture.

---

This invention relates to the preparation of trioxane, and more particularly to an improved method for producing polymerization-grade trioxane in large quantities.

The recent surge of activity in the field of formaldehyde and trioxane polymers and copolymers has necessitated the development of new methods for the preparation of high-purity formaldehyde and trioxane. To be successfully polymerized, trioxane must have a water content of less than 100 p.p.m., preferably less than 50 p.p.m. Moreover, impurities such as formaldehyde and formic acid impair the polymerization process and make the formation of high molecular weight polymers impossible to burdensome. Therefore, it has become increasingly important to prepare trioxane of very high purity. Further, because of the large amounts of trioxane-based polymeric materials now being prepared it is necessary to develop economical methods for the production of large amounts of trioxane.

Trioxane may be prepared from aqueous solutions of formaldehyde by distillation in the presence of a non-volatile, strong acid catalyst such as sulfuric acid or a sulfonic acid cation exchange resin. This method is described in U.S. Patents 2,304,080, 3,149,127 and 3,176,023. The distillate contains, in addition to the desired trioxane, large amounts of formaldehyde and water and smaller quantities of impurities such as formic acid, methanol, methylal and the like. Separation of trioxane from these impurities has heretofore been accomplished by extracting trioxane from the mixture by means of a water-immiscible solvent such as benzene or methylene chloride. The product obtained thereby, while quite pure, still contains quantities of formaldehyde, water and formic acid which impair polymerization.

A principal object of the present invention, therefore, is to provide a method for the preparation of polymerization-grade trioxane.

A further object is to provide a method for trioxane preparation which is suitable for high productivity of trioxane under relatively inexpensive conditions.

Still another object is to provide a convenient, continuous method for the preparation of trioxane.

Other objects will in part be obvious and will in part appear hereinafter.

It has been discovered that the productivity of trioxane formation from aqueous formaldehyde in the presence of a strong acid catalyst, which productivity is calculated and reported herein as grams of trioxane produced per hour per 1000 grams of reaction mixture, actually increases with an increase in the distillation rate of the reaction mixture. It is true that in the process of this invention, formaldehyde conversion to trioxane is found to decrease with an increase in the distillation rate. Contrary to findings reported in the prior art, however, this decrease is found not to be inversely proportional to the increase in distillation rate. Additionally, such decrease realized can be counteracted by recycling unreacted formaldehyde in the distillate. Further, it has been discovered that after the trioxane thus obtained has been separated from the bulk of the formaldehyde and water in the distillate by extraction with a water-immiscible solvent, remaining traces of impurities (including water, formaldehyde and formic acid) may be removed by first chemically treating the trioxane product with a basic compound such as, for example, an alkali metal carbonate, an alkaline earth metal oxide or an anion exchange resin; and thereafter contacting the thus purified trioxane product with a molecular sieve.

Accordingly, this invention is directed toward an improvement in the method for the continuous preparation of polymerization-grade trioxane whereby a mixture of aqueous formaldehyde of at least about 50 percent concentration with about 1 to 5 percent, by weight thereof, of a non-volatile, strong acid catalyst is distilled and trioxane is recovered from the distillate by extraction with water-immiscible solvent; said improvement comprising the steps of (1) distilling the reaction mixture at a rate of above about 150 grams per hour per 1000 grams of said mixture, and (2) contacting the trioxane product with at least one of the above-described basic compounds and thereafter with a molecular sieve to remove water, formaldehyde, formic acid and other impurities therefrom.

The raw material from which trioxane is prepared by the method of this invention is an aqueous solution of formaldehyde. While it is possible to use an ordinary formalin solution (37 percent formaldehyde), the productivity is quite low when such a dilute solution is used. Accordingly, it is advantageous to employ a formaldehyde solution containing at least 50 percent and preferably from 60 to 70 percent formaldehyde. Such solutions may be prepared by concentrating a 37 percent formaldehyde solution under vacuum.

In the practice of this invention, the catalyst is employed in an amount comprising about 1 to 5 percent by weight of the formaldehyde solution. Catalysts which suitably may be used herein for conversion of formaldehyde to trioxane include non-volatile mineral acids such as sulfuric acid, perchloric acid, phosphoric acid and the like; non-volatile organic acids such as aromatic sulfonic acids, e.g., benzenesulfonic acid, toluenesulfonic acid, etc.; and organic ion exchange resins which are prepared by the reaction of an aldehyde, a phenol and a sulfonic acid or a sulfite, or by sulfonating synthetic organic materials as copolymers of styrene, ethyl vinyl benzene and divinyl benzene. Such ion exchange resins which are strongly acid in character are known commercially by such trade names as "Duolite," "Amberlite," "Dowex" and "Permutit." Of these catalysts, sulfuric acid has been most conveniently and satisfactorily employed and is presently preferred in the method of this invention.

The acidic formaldehyde solution is distilled and trioxane is recovered from the distillate as described hereinafter. Although it is generally not possible to separate the trioxane completely from the aqueous formaldehyde solution by distillation, optimum separation conditions are attained by the use of a fractionating column with provision for partial reflux. However, distillation columns with high liquid hold-up are not suitable for use according to the method of this invention. Thus, bubble-cap and similar columns should not be used. Moreover, since formaldehyde polymerizes on cold surfaces under the conditions of this process, it is necessary to maintain all surfaces with which the reaction mixture comes in contact (either as a liquid or a vapor) at relatively high temperatures, preferably around 87° to 97° C. It has been found that optimum conditions are attained with the use of a column packed with glass helices or the like, the upper portion of said column being furnished with a jacket through which heating liquid may be circulated to maintain the column at the proper temperature.

A crucial aspect of the method of the present invention is the discovery that trioxane productivity increases with a substantial increase in the distillation rate of the reaction mixture. As stated earlier herein, it has been indicated in the prior art that the yield of trioxane in the distillate is inversely related to the rate of distillation. According to the present invention, however, it has been discovered that the rate of yield decrease is not so great as the rate of increase in the distillation rate. The result is that while yields decrease as the distillation rate increases, the productivity of trioxane, in terms of grams per hour per 1000 grams of reaction mixture, increases as the distillation rate goes up. Thus, a substantial increase in productivity over that reported in the prior art is attained by distilling the reaction mixture at a rate above about 150 grams per hour per 1000 grams of reaction mixture, instead of the 50 grams per hour or less indicated in the prior art. To obtain the maximum trioxane productivity in the practice of this invention, it is preferred to distill the reaction mixture at a rate of about 200 to 550 grams, and still more preferably at about 250 to 350 grams per hour per 1000 grams of reaction mixture. As mentioned earlier, the adverse effect of the higher distillation rate on percentage yield of trioxane is counteracted by recycling the aqueous formaldehyde in the distillate.

Following the distillation, trioxane is separated from the aqueous formaldehyde solution in the distillate by extraction with a solvent which is immiscible with water. Suitable solvents include chlorinated aliphatic or aromatic hydrocarbons, cycloalkanes and aromatic hydrocarbons. Of these types, specific preferred solvents are methylene chloride, chloroform, benzene, o-dichlorobenzene and 1,2,4-trichlorobenzene. The choice of a single solvent will depend, of course, on a balance of the advantages and disadvantages of the above-described, specific solvents. For example, methylene chloride is an excellent solvent for trioxane and its boiling point is low enough so that it does not distill at the same temperature as trioxane; thus, separation of solvent and product is facilitated. However, formaldehyde is somewhat more soluble in methylene chloride than in aromatic solvents such as benzene. Therefore, for optimum separation of trioxane from unreacted formaldehyde in the distillate benzene is preferred. However, benzene may be disadvantageous because of its boiling point, very close to that of trioxane, and the fact that the solubility of trioxane in benzene is substantially lower than in methylene chloride. Alternatively, if a high-boiling solvent such as 1,2,4-trichlorobenzene or α-chloronaphthalene is used, trioxane, being the lower-boiling component, can easily be recovered by distillation and the solvent recycled for further use.

Trioxane obtained by distillation followed by extraction, as described hereinabove, is quite pure and suitable for a number of uses. However, for polymerization purposes it is important to remove substantially all water, formic acid, formaldehyde and other impurities from the trioxane. According to the present invention, therefore, these impurities are removed by treating the trioxane with a basic compound as previously described and then subsequently with a molecular sieve.

In general, the basic compounds which suitably may be used herein to remove traces of formaldehyde and formic acid from the trioxane product include anhydrous alkali metal carbonates, e.g., sodium or potassium carbonate; alkaline earth metal oxides, e.g., calcium oxide, magnesium oxide, etc.; and anionic exchange resins, e.g., synthetic resin amines. Of these compounds, calcium oxide is presently preferred for use as the reaction thereof with formic acid yields formates which are essentially insoluble and hence are easily removed by filtration. It is to be understood that the trioxane product either in solution or in a molten state stripped of solvent may be treated effectively with the basic compound. However, in the method of this invention as presently practiced, the trioxane solution in the water-immiscible solvent usually is employed. By contacting this solution with from 0.1 to 6.0 percent of basic compound, based on the total weight of the solution, essentially all the formic acid present in the trioxane is removed. When employing the anhydrous carbonates and particularly calcium oxide a quantity of these compounds ranging from 0.2 to 1.0 percent, based on the total weight of solution, generally has been satisfactory and is preferred. However, it should be understood that in the event of a substantial formic acid concentration in the trioxane solution, all of the said acid may not be removed by this treatment. Whatever acid may still remain, however, will be removed by the subsequent molecular sieve treatment in the final purification of the trioxane product. Following treatment with the basic compound, the solvent is removed by fractional distillation. The crude trioxane in the molten state is then treated with from about 5 to 15 percent, by volume of trioxane, of a molecular sieve. In present practice, the molecular sieves are added to the trioxane and contacted thoroughly therewith by vigorous agitation, after which the trioxane is separated from the sieves by filtration. Alternatively, the molten trioxane may be passed through a column packed with molecular sieves and which is heated so as to keep the trioxane in molten form.

Molecular sieves are formed by dehydrating certain natural aluminosilicates and similar zeolite molecules. These molecules, while ordinarily hydrated, may be dehydrated without losing their crystalline structure, so that the spaces formerly occupied by water of hydration become voids and are capable of absorbing water or other materials.

The molecular sieves which have been found most useful for purification of trioxane according to the present invention are potassium aluminosilicates which absorb particles less than three angstroms in diameter; these are known as 3 A. molecular sieves. After the removal of solvent from the trioxanes, the liquid trioxanes is contacted with these sieves to remove water. Small quantities of formaldehyde and formic acid which may be present are also removed. After the calcium oxide and molecular sieve treatment, the trioxane contains less than 20 p.p.m. each of water and formic acid, and substantially no formaldehyde. It may easily be polymerized to very high molecular weight polymers. Also it may be copolymerized with a number of comonomers to form resins having a wide variety of uses and applications.

The method of this invention is adaptable for either batch or continuous operations for the production of trioxane. In a continuous operation, the distillation vessel is charged initially with formaldehyde solution and acid, and additional formaldehyde solution is added throughout the distillation at the same rate at which distillate is recovered. The acid catalyst, being non-volatile, remains in the vessel and is active throughout the distillation process.

In order that those skilled in the art may more completely understand the present invention and the preferred methods by which the same may be carried into effect, the following specific examples are offered.

EXAMPLE 1

A 60-percent aqueous solution of formaldehyde is placed in a distillation flask and sulfuric acid as added to a concentration of 4.0 percent, by weight of the reaction mixture. The mixture is distilled through a column packed with glass helices, surmounted by another column section packed with helices and maintained at 92° C. by means of a heated water jacket. The initial distillation rate is determined by collecting a sample of distillate (distillate sample A) in a prescribed time period, after the distillation has progressed, then weighing the collected distillate and calculating the distillation rate based on the average weight of the reaction mixture during the distillate collection period, and then adjusting the value obtained on the basis of 1000 grams of reaction mixture distilled per hour. Using this procedure, the distillation rate calculated is 213 grams per hour per 1000 grams of reaction mixture. The distillate recovered is extracted with methylene chloride and the agitated methylene chloride solution is contacted with 0.3 percent of its weight of calcium oxide. The methylene chloride solution is then separated from the calcium oxide by filtration and is stripped of solvent by distillation under a slight positive nitrogen pressure. The separated trioxane product in molten state is contacted with 3 A. molecular sieves to remove the last traces of water, formaldehyde and formic acid. As indiciated by analytical chemical analysis and by vapor phase chromatography, the resulting product contains less than 20 p.p.m. each of water and formic acid. The productivity of this distillation procedure is 72.6 grams of trioxane per hour per 1000 grams of reaction mixture, the formaldehyde conversion is 40.9 percent.

Another sample of distillate (distillate sample B) is collected and weighed and the distillation rate is calculated as described above. The rate calculated is 297 grams per hour per 1000 grams of reaction mixture. Separation of trioxane from the distillate and the subsequent purification thereof are carried out as described above. The productivity in this second phase of the distillation is 87.4 grams of trioxane per hour per 1000 grams of reaction mixture and the formaldehyde conversion is 52.9 percent.

With further distillation and recovery of another measured sample of distillate (distillate sample C), calculations carried out as previously described show the distillation rate to have increased to 309 grams per hour per 1000 grams of reaction mixture and the productivity of trioxane to be 103 grams per hour per 1000 grams of reaction mixture. The formaldehyde conversion in this instance is 56.4 percent.

This example illustrates that with an increased distillation rate, the productivity of trioxane is likewise increased. It is true that the concentration of trioxane in the distillate appears to decrease with distillation rate increase, as trioxane concentrations of 34.1 and 29.4 percent are found in distillate samples A and B, respectively. However, with the higher distillation rate, higher conversions of formaldehyde to trioxane are realized in the same time period.

EXAMPLE 2

A one-liter distillation flask equipped with a distilling column as described in Example 1 and means for adding formaldehyde thereto is charged with 700 grams of 60 percent aqueous formaldehyde solution. Sulfuric acid is added to a concentration of 4 percent. Distillation is commenced while maintaining the upper distillation column at 90.2° C. by a water-heated jacket, and the flask is continuously charged with 60 percent formaldehyde solution to replace the distilled material. During the distillation, an additional 874 grams of formaldehyde solution is added and 853 grams of distillate is removed over a period of 4 hours, the average distillation rate is 287 grams per hour per 1000 grams of reaction mixture. The productivity of trioxane in this procedure is calculated at 83.9 grams per hour per 1000 grams of reaction mixture, the total conversion being 52.6 percent. Based on the weight of formaldehyde charged and accounted for at the end of the distillation, the formaldehyde efficiency is found to be 96.6 percent of theoretical. The trioxane product is isolated and purified as previously described.

EXAMPLE 3

To illustrate the method of this invention as operated continuously, a 500-milliliter distillation flask fitted with an agitator, distillation columns and formaldehyde addition means as described in Example 2 is charged with 175 grams of a 68 to 69 percent aqueous formaldehyde solution and sulfuric acid to a concentration of 3.9 weight percent. The flask and its contents are heated in an oil bath and distillation is started while maintaining the upper distillation column at 87.8° C. by means of a heated water jacket. As the distillate is removed, 68 to 69 percent aqueous formaldehyde solution is added to the flask at the same rate (ml./min.). During the distillation (which is carried out for 36 hours) a total of 2427 grams of formaldehyde solution is added. The total distillate recovered is 2311 grams, so that the average distillation rate is 328 grams per hour per 1000 grams of reaction mixture. In this example, the productivity of trioxane is 168 grams per hour per 1000 grams of reaction mixture. The formaldehyde efficiency based on the weight charged and that accounted for at the end of distillation is 99 percent of theoretical. The trioxane product which is separated and purified as previously described contains no formaldehyde and less than 20 p.p.m. each of formic acid and water as determined by chemical and chromatographic analysis.

EXAMPLES 4–6

To further illustrate that increased trioxane productivity is obtained in the process of this invention, when the distillation rate of the reaction mixture is increased, three different distillations are carried out according to the continuous method outlined in Example 3. For each run, 150 grams of a 67 to 68 percent formaldehyde solution and 3 percent sulfuric acid, by weight of said solution, are changed to the flask. The distillation rates are varied by maintaining each reaction mixture at a different temperature whereby the head temperature in each distillation column is different. As distillate is removed, 67 to 68 percent formaldehyde solution is added to each flask at the same rate. The trioxane product is isolated from each distillate recovered and is then purified as previously described. Using this procedure, the results are as follows:

| Example | Head temperature, °C. | Average [1] distillation rate | Percent trioxane in distillate | Trioxane [1] productivity |
|---|---|---|---|---|
| 4 | 93–94 | 283 | 47.5 | 135 |
| 5 | 94–95 | 327 | 45.9 | 150 |
| 6 | 96–97 | 546 | 32.4 | 174 |

[1] Grams per hour per 1,000 grams reaction mixture.

As the above data indicate, the percent of trioxane in the distillate decreases with increased distillation rate. However, with the increased amount of distillate recovered at faster distillation rates compared to that obtained at slower rates within the same time period, higher trioxane productivity is realized as the distillation rate is increased.

EXAMPLES 7–8

Two additional runs are carried out according to the procedure described in Examples 4–6. In these examples, 59 percent formaldehyde solution is employed along with 3 percent sulfuric acid, by weight. Results are as follows:

| Example | Head temperature, °C. | Average [1] distillation rate | Percent trioxane in distillate | Trioxane [1] productivity |
|---|---|---|---|---|
| 7 | 94.5 | 310 | 36.6 | 113 |
| 8 | 96.8 | 384 | 34.2 | 131 |

[1] As described previously.

It is to be understood that although the invention has been described with specific reference to particular em-

What is claimed is:

1. In a method for the preparation of polymerization-grade trioxane whereby a mixture of aqueous formaldehyde of at least 50 percent concentration and about 1 to 5 percent, by weight of said formaldehyde solution of a non-volatile acid as catalyst is distilled at a temperature of 87° to 97° C., and trioxane is separated from the distillate by extraction with a water-immiscible solvent, the improvement which comprises the steps of (1) contacting the trioxane product while in solution in said solvent with from 0.1 to 6 percent, based on the weight of solution of a basic compound which is an alkali metal carbonate, an alkaline earth metal oxide or an anion exchange resin in order to remove substantially all of the formic acid impurity from the trioxane; (2) separating the insoluble formate products formed from the trioxane solution by filtration; (3) isolating the trioxane by fractional distillation of the solvent; (4) treating the isolated trioxane in molten form with a molecular sieve to remove traces of water, formaldehyde, formic acid and other impurities from the product whereby trioxane containing essentially no formaldehyde and less than 20 p.p.m. each of water and formic acid is recovered.

2. The method of claim 1 wherein the non-volatile acid catalyst is sulfuric acid.

3. The method of claim 1 wherein the non-volatile acid catalyst is a sulfonic acid ion exchange resin.

4. The method of claim 1 wherein the basic compound is calcium oxide, employed in an amount ranging from about 0.2 to 1.0 percent by weight of the solution of trioxane in the water-immiscible solvent.

5. The method of claim 1 wherein the basic compound is an anhydrous alkali metal carbonate, employed in an amount ranging from about 0.2 to 1.0 percent by weight of the solution of trioxane in the water-immiscible solvent.

6. The method of claim 1 wherein the molecular sieve is a 3 A. molecular sieve.

7. A method for the preparation of polymerization-grade trioxane containing essentially no formaldeyde and less than 20 p.p.m. each of water and formic acid which comprises the steps of distilling at a temperature of 87° to 97° C. an aqueous solution containing at least about 50 percent formaldehyde in the presence of about 1 to 5 percent, by weight of said formaldehyde solution of sulfuric acid; extracting trioxane from the distillate with an organic, water-immiscible solvent selected from the group consisting of chlorinated aliphatic and aromatic hydrocarbons, cycloalkanes and aromatic hydrocarbons; contacting the trioxane solution in said solvent with about 0.2 to 1.0 percent, by weight of said solution of calcium oxide; filtering the treated trioxane solution to remove the insoluble formate products therefrom; distilling the solvent and contacting the molten trioxane with a 3 A. molecular sieve.

8. The method of claim 7 wherein the solvent is methylene chloride.

9. The method of claim 7 wherein the solvent is benzene.

10. The method of claim 7 wherein the distillation is operated continuously, while the distilled material is continuously replaced with formaldehyde solution.

References Cited
UNITED STATES PATENTS

| | | | |
|---|---|---|---|
| 3,149,127 | 9/1964 | Platz | 260—340 |
| 3,176,023 | 3/1965 | Vamase | 260—340 |
| 3,197,437 | 7/1965 | Wall | 260—67 |

NORMA S. MILESTONE, Primary Examiner